Sept. 28, 1926.
H. MELCHER ET AL
1,601,256
APPARATUS FOR FACILITATING THE LINING OF TRANSMISSION BANDS
Filed Feb. 1, 1926     2 Sheets-Sheet 1
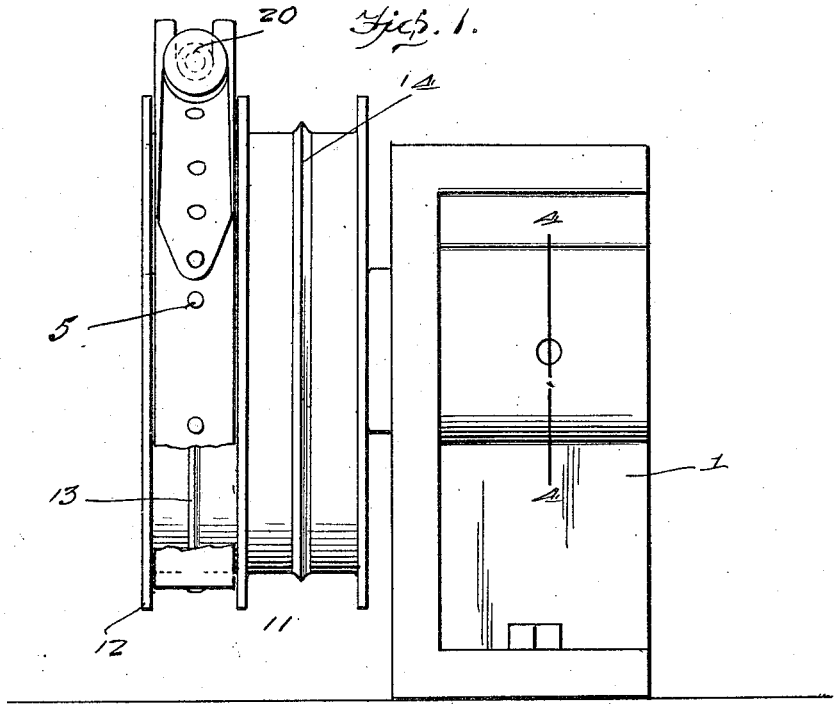
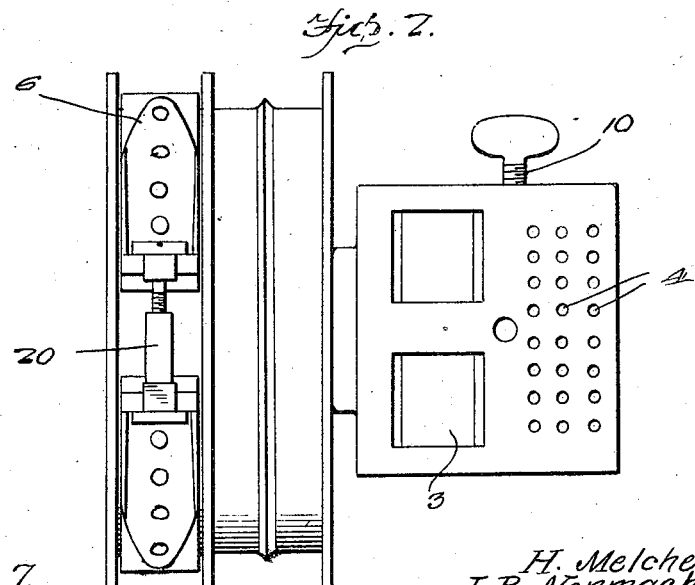
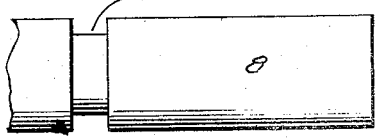
Inventors
H. Melcher
J. B. Nonmacher
By Clarence A. O'Brien
Attorney Sept. 28, 1926.
H. MELCHER ET AL
1,601,256
APPARATUS FOR FACILITATING THE LINING OF TRANSMISSION BANDS
Filed Feb. 1, 1926  2 Sheets-Sheet 2
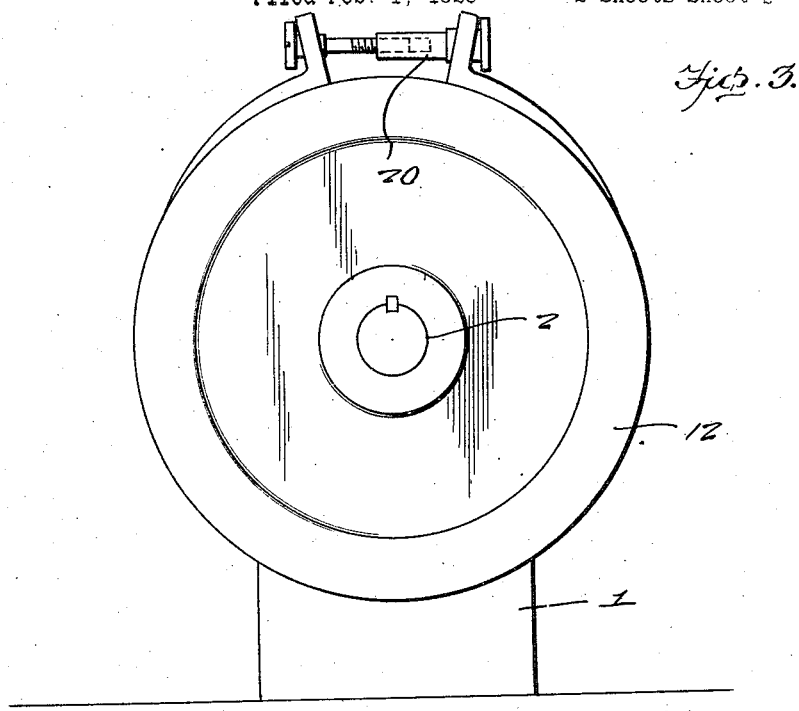
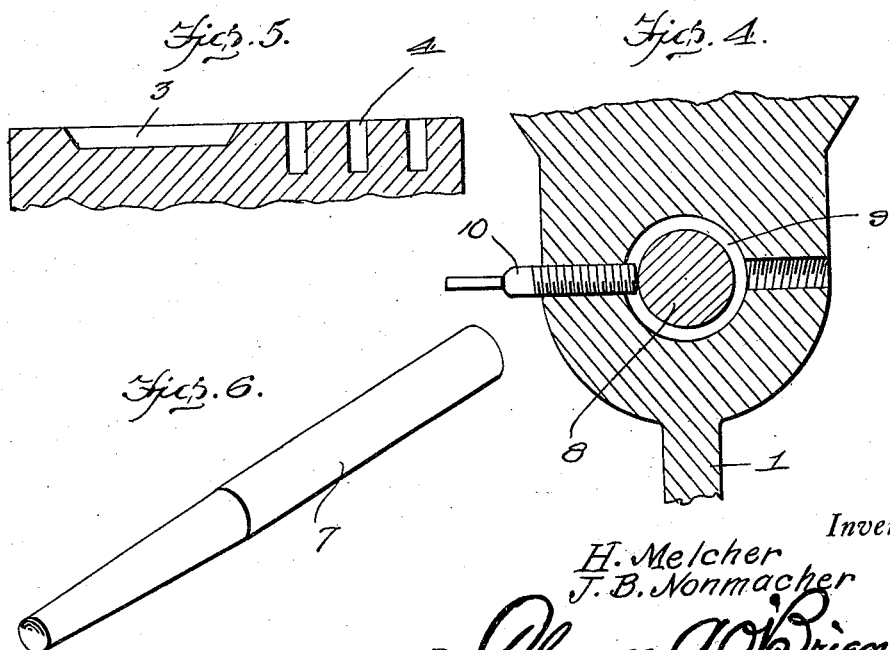

Patented Sept. 28, 1926.

1,601,256

UNITED STATES PATENT OFFICE.

HERMAN MELCHER AND JOHN B. NONMACHER, OF NEW ULM, TEXAS.

APPARATUS FOR FACILITATING THE LINING OF TRANSMISSION BANDS.

Application filed February 1, 1926. Serial No. 85,349.

Our present invention has to do with the lining and relining of transmission bands, such as are employed upon Ford automobiles; and it has for its general object to provide an apparatus by the use of which the lining or relining of transmission bands is not only facilitated but is accomplished in a thorough manner, and this with but little effort on the part of the operator.

Other objects and practical advantages of the invention will be fully understood from the following description and claims when the same are read in connection with the drawings, accompanying and forming part of this specification, in which:—

Figure 1 is a side elevation of the apparatus constituting the best practical embodiment of our invention of which we are aware.

Figure 2 is a top plan view of the same.

Figure 3 is an end elevation taken at right angles to Figure 1 and from a view point at the left of Figure 1.

Figure 4 is a fragmentary transverse section taken in the plane indicated by the line 4—4 of Figure 1.

Figure 5 is a vertical section taken through the top portion of the stand comprised in the apparatus.

Figure 6 is a perspective of the pick up device and punch.

Figure 7 is a fragmentary view of the arbor of the apparatus, showing the circumferential groove therein.

Similar numerals of reference designate corresponding parts in all of the views of the drawings.

Our novel apparatus is formed by preference, of appropriate metal or metals, and among its elements, is comprised a stand 1, characterized by a bore 2 and by one or more shallow grease cups 3, Figures 2 and 5, and by a plurality of sockets 4, Figures 2 and 5, any suitable number of the said sockets 4 being employed, and the same being designed to receive and hold rivets such as 5, employed in the connection of lining to a brake band such as designated by 6, and shown in Figures 1, 2 and 3. In the use of our novel apparatus, a plurality of rivets 5 are arranged with their shanks in the sockets 4, and grease is disposed in the cups 3, and a pick up and punch device 7, Figure 6, is employed to facilitate the removal of the rivets from the sockets 4 and to hold the rivets in proper position in the transmission band 6 and the lining thereof and to receive hammer blows as hereinafter described. In the said use of the device 7 the end of the said device is placed in one of the cups 3 for the greasing of said end, and the end is then pressed upon the head of one of the rivets whereupon the rivet may be lifted out of its socket 4 and through the medium of the device 7 may be transferred to position in the transmission band and the lining positioned at the inner side of the said band, and may be held for the imposition of blows or pressure on the rivets through the device 7.

Journaled in the aperture 2 of the stand 1 is an arbor 8 with a circumferential groove 9, and bearing in the stand 1 is a thumb screw 10 the inner end of which is disposed in the said circumferential groove 9. Manifestly by turning the screw inwardly so as to set the same against the arbor 8, the said arbor 8 may be detachably fixed against turning as is desirable incident to the use of the apparatus.

Fixed to the arbor 8 is a drum 11, equipped for use in the riveting of linings to transmission bands. In this connection we would have it understood that the drum is equipped peripherally with means for spreading the prongs of the rivets 5 at the inner sides of the lining of the transmission bands so as to contribute to the security of the attachment of the said lining to the bands when the bands are detachably secured about the drum 11 after the manner shown in Figures 1, 2 and 3.

In the preferred embodiment of our invention the drum 11 is circumferentially flanged as designated by 12, three flanges being preferably employed and spaces of different widths being preferably provided between the intermediate flange and the side flanges to receive bands of different widths. It will also be noticed that in the comparatively narrow space between flanges 12 a circumferential rib 13 of V-form in cross-section is arranged, while in the comparatively wide space a circumferential rib 14 greater in width than the rib 13 is employed; the rib 13 being for use when a narrow band is to be riveted, and the rib 14 when a wide band is to be riveted.

Our improvement also comprises the clamp shown in Figures 1, 2 and 3. The said clamp 20 is inserted in the prongs of the transmission band and is used for both narrow and wide bands in the drawing of the band tight to the lining around the drum, a screw driver being preferably employed for the manipulation of the clamp.

In the practical use of our improvement it will be understood that a lining being placed within a brake band or other band 6, the said band 6 and the lining are secured about the ribbed portion of the drum 11, and around either the rib 13 or the rib 14 according to the width of the transmission band. The band and the lining are tightened about the drum and the rib thereof by manipulation of the clamp 20. The riveting of the lining to the band is carried out by holding the rivets through the medium of the device 7, and then striking the device 7 with a hammer or the like, whereupon the rib 13 or 14, as the case may be, will operate by entering between the prongs of the rivets to spread the said prongs so as to enable the same to retain the lining against the transmission band and to crowd the lining against said band. After the attachment in the manner described of the lining to the transmission band, the clamp 20 is loosened and removed, whereupon the lined band may be expeditiously and easily removed from the drum.

In the modern Ford automobile wide and narrow transmission bands are employed; and it will be gathered from the foregoing that our apparatus is adapted to facilitate the lining of either wide or narrow bands; the wide band being placed about the rib 14, and the narrow band about the rib 13. In either case the device 7 is employed for the picking up and holding of the rivets and to receive the hammer blows through the medium of which the prongs of the rivets are upset by the rib 14 or the rib 13, as the case may be.

Notwithstanding the capacity of function of our novel apparatus as set forth in the foregoing, it will be noted that the apparatus is simple and inexpensive in construction and has no delicate parts such as are likely to get out of order after a short period of use.

As before indicated, the construction herein illustrated and described constitutes the best practical embodiment of our invention of which we are cognizant, and we therefore, prefer to employ all of the said construction in practice. We do not desire, however, to be understood as limiting ourselves to the specific construction and relative arrangement of the elements disclosed, our invention being defined by our appended claims within the scope of which changes in structure and changes in relative arrangement may be made without departure from our invention.

Having described our invention, what we claim and desire to secure by Letters-Patent, is:—

1. An apparatus for facilitating the lining of transmission bands having a mandrel of circular form with a peripheral rib about which a transmission band and lining may be held; said rib being arranged to spread the prongs of bifurcated rivets, and means for so holding a transmission band and lining.

2. An apparatus for facilitating the lining of transmission bands comprising a revoluble drum forming a mandrel, a circumferential rib on said mandrel arranged to spread the prongs of bifurcated rivets inserted through a lining and band disposed on the mandrel, and flanges on said mandrel for positioning the lining and band in proper relation thereon.

3. An apparatus for facilitating the lining of transmission bands, comprising a stand, an arbor journaled in said stand, means on the stand for detachably fixing the arbor against turning about its axis, a drum forming a mandrel fixed to the arbor and disposed alongside the stand, and a circumferential element on said mandrel adapted to enter between prongs of rivets extending through the transmission band and lining and spread said prongs when the rivets are forced inwardly.

4. An apparatus for facilitating the lining of transmission bands, comprising a stand, an arbor journaled in said stand, means on the stand for detachably fixing the arbor against turning about its axis, a drum forming a mandrel fixed to the arbor and disposed alongside the stand, a circumferential element on said mandrel adapted to enter between prongs of rivets extending through the transmission band and lining to spread said prongs when the rivets are forced inwardly, and flanges disposed on the opposite sides of said circumferential element and in spaced relation thereto for positioning the transmission band and lining in proper relation on the mandrel.

5. An apparatus for facilitating the lining of transmission bands, comprising a stand, an arbor journaled therein, a drum forming a mandrel fixed to the arbor and disposed alongside the stand, circumferential ribs on said mandrel for spreading the bifurcated shanks of rivets inserted through linings and bands disposed on the mandrel, and flanges on the opposite sides of said ribs and so disposed in spaced relation thereto as to form positioning means for bands and linings of different widths.

6. An apparatus for facilitating the lining of transmission bands, comprising a mandrel of circular form, circumferential ribs on said mandrel for spreading the bifurcated shanks of rivets inserted through linings and bands disposed on the mandrel, flanges on the opposite sides of said ribs and so disposed in spaced relation thereto as to form positioning means for bands and linings of different widths, and means for detachably securing a band and lining disposed on said mandrel in position.

7. An apparatus for the purpose described comprising a stand, a circular mandrel mounted alongside and supported by the stand, and circumferential means projecting from its periphery for spreading the prongs of rivets joining a transmission band and lining when the band and lining are disposed about the mandrel and the rivets are forced inwardly.

8. An apparatus for the purpose described comprising a stand, a circular mandrel mounted alongside and supported by the stand, spaced circumferential ribs projecting from the periphery of said mandrel for spreading the prongs of rivets joining a transmission band and lining when the band and lining are disposed about the mandrel, and the rivets are forced inwardly, and circumferential flanges at the opposite sides of said ribs, and so disposed with relation thereto as to form positioning means for bands of different widths and prevent lateral shifting of the bands and linings during the fastening operations.

9. An apparatus for the purpose described comprising a stand, and a circular mandrel mounted alongside and supported by the stand and having circumferential means projecting from its periphery for spreading the prongs of rivets joining a transmission band and lining when the band and lining are disposed about the mandrel and the rivets are forced inwardly, and a detachable clamp for tightening a transmission band about the mandrel.

In testimony whereof we affix our signatures.

HERMAN MELCHER.
JOHN B. NONMACHER.